United States Patent
Zhang et al.

(10) Patent No.: US 10,348,591 B2
(45) Date of Patent: Jul. 9, 2019

(54) METHOD AND APPARATUS FOR DETECTING USER NETWORK INTERFACE CONNECTIVITY OF VIRTUAL PRIVATE NETWORK

(71) Applicant: ZTE CORPORATION, Guangdong (CN)

(72) Inventors: Yan Zhang, Guangdong (CN); Rui Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 234 days.

(21) Appl. No.: 15/313,166

(22) PCT Filed: Sep. 12, 2014

(86) PCT No.: PCT/CN2014/086449
§ 371 (c)(1),
(2) Date: Nov. 22, 2016

(87) PCT Pub. No.: WO2015/180292
PCT Pub. Date: Dec. 3, 2015

(65) Prior Publication Data
US 2017/0359239 A1 Dec. 14, 2017

(30) Foreign Application Priority Data
May 27, 2014 (CN) .......................... 2014 1 0228082

(51) Int. Cl.
*H04L 12/26* (2006.01)
*H04L 12/24* (2006.01)
*H04L 12/46* (2006.01)

(52) U.S. Cl.
CPC ...... *H04L 43/0811* (2013.01); *H04L 12/4641* (2013.01); *H04L 41/0803* (2013.01);
(Continued)

(58) Field of Classification Search
CPC ................................ H04L 43/08; H04L 41/08
(Continued)

(56) References Cited

U.S. PATENT DOCUMENTS

| | | | |
|---|---|---|---|
| 2005/0289395 A1* | 12/2005 | Katsuyama | ......... H04L 41/0631 714/25 |
| 2012/0236761 A1* | 9/2012 | Yang | ..................... H04L 61/103 370/259 |

FOREIGN PATENT DOCUMENTS

| | | |
|---|---|---|
| CN | 1383292 A | 12/2002 |
| CN | 1713594 A | 12/2005 |

(Continued)

OTHER PUBLICATIONS

Huawei, "Huawei NE20E-S Universal Service Router V800R005C01 Configuration Guide—System Monitor—Issue 03", pp. 1-170, retrieved from the Internet: URL:http://support.huawei.com/enterprise/docinforeader.action?contentId=DOC1000025222 (Apr. 30, 2014).

(Continued)

*Primary Examiner* — Glenford J Madamba
(74) *Attorney, Agent, or Firm* — Scully Scott Murphy & Presser

(57) ABSTRACT

A method for detecting connectivity of user node interface in a virtual private network includes: acquiring a configuration parameter used for detecting connectivity of a user node interface between a source address and a destination address in the virtual private network; transmitting an Internet Control Message Protocol (ICMP) request packet from the source address to the destination address through the configuration parameter, and receiving an ICMP response packet responded by the destination address; and after receiving the ICMP response packet responded by the destination address, calculating a round-trip time value of a link between the source address and the destination address, and then collecting statistics on the connectivity of the user node interface between the source address and the destination address according to the round-trip time value obtained by calculation.

15 Claims, 4 Drawing Sheets

(52) U.S. Cl.
CPC .......... *H04L 43/0864* (2013.01); *H04L 43/10* (2013.01); *H04L 43/087* (2013.01)

(58) Field of Classification Search
USPC .......................................... 709/224
See application file for complete search history.

(56) References Cited

FOREIGN PATENT DOCUMENTS

| | | | | |
|---|---|---|---|---|
| CN | 101030898 A | 9/2007 | | |
| CN | 103580935 A | 2/2014 | | |
| CN | 103650427 A | 3/2014 | | |
| CN | 104639385 A | 5/2015 | | |
| EP | 1246396 A2 | 10/2002 | | |
| EP | 1 814 258 A2 | 8/2007 | | |
| EP | 1814258 A2 * | 8/2007 | ......... | H04L 12/2697 |
| WO | 2015/070614 A1 | 5/2015 | | |

OTHER PUBLICATIONS

Extended Supplementary European Search Report dated Nov. 6, 2017 received in European Patent Application No. 14 89 3649.5.
International Search Report dated Mar. 2, 2015 issued in PCT/CN2014/086449.
Huawei, "Huawei NE20E-S Universal Service Router V800R005C01 Configuration Guide-System Monitor-Issue 03", pp. 1-315, retrieved from the Internet: URL:http://support.huawei.com/enterprise/docinforeader.action?contentId=DOC1000025222 (Apr. 30, 2014), together with an English-language translation.

* cited by examiner

METHOD AND APPARATUS FOR DETECTING USER NETWORK INTERFACE CONNECTIVITY OF VIRTUAL PRIVATE NETWORK

CROSS-REFERENCE TO RELATED APPLICATIONS

The present disclosure is the 371 application of PCT Application No. PCT/CN2014/086449 filed Sep. 12, 2014, which is based on and claims priority to Chinese Patent Application No. 201410228082.5, filed May 27, 2014, the entire contents of which are incorporated herein by reference.

TECHNICAL FIELD

The present disclosure relates to the field of communication technologies, and more particularly, to a method and apparatus for detecting connectivity of user node interface (UNI) in a virtual private network.

BACKGROUND

As more and more types of services run on the Internet, higher requirements are put forward on fault detection and management of a carrier-class network, operators may ask equipment manufacturers to provide switching equipment and optical network equipment supporting OAM (Operation, Administration and Maintenance) functions to ensure that the Ethernet also can provide carrier-class requirements, including functions of timely detection, recovery and management of network exception error or exception problem such as service degradation and failure.

As an access device of an IP-based base station, a Packet Transport Network (PTN) device generally is connected to a Layer 2 Virtual Private Network (L2VPN) by configuring a Port, Port+VLAN (Virtual Local Area Network) for a UNI. When failures occur in base station services (for example, service interruption), means need to be provided to detect whether the base station can be connected to the UNI of the PTN device.

At present, a Connectivity Fault Management (CFM) solution and a Media Access Control (MAC)-PING solution are mainly used. In the CFM solution, a CFM and an MAC-PING may be used to detect the connectivity between the base station and the UNI of the PTN device, but it is impossible to ensure all base stations support the CFM. Whereas in the MAC-PING solution, connectivity detection of some nodes is unavailable unless MAC address information of a base station is known. However, in some cases the MAC address is unknown. As the L2VPN technology is used increasingly widely, demands for L2VPN network maintenance and fault location naturally become necessary. Therefore, accurate and rapid fault detection seems more and more important.

This section provides background information related to the present disclosure which is not necessarily prior art.

SUMMARY

Embodiments of the present disclosure provide a method and apparatus for detecting connectivity of user node interface in a virtual private network to at least overcome the foregoing technical problem or at least partially solve the foregoing technical problem to implement an accurate and quick detection of the connectivity of the user node interface of the virtual private network.

According to one aspect of the embodiments of the present disclosure, there is provided method for detecting connectivity of user node interface in a virtual private network, including:

acquiring a configuration parameter used for detecting connectivity of a user node interface between a source address and a destination address in the virtual private network;

transmitting an Internet Control Message Protocol (ICMP) request packet from the source address to the destination address through the configuration parameter and receiving an ICMP response packet responded by the destination address; and calculating out a round-trip time value of a link between the source address and the destination address after receiving the ICMP response packet responded by the destination address, and then collecting statistics on the connectivity of the user node interface between the source address and the destination address according to the round-trip time value obtained by calculation.

Optionally, the step of acquiring a configuration parameter used for detecting a connectivity of a user node interface between a source address and a destination address in the virtual private network includes:

acquiring the configuration parameter used for detecting the connectivity of the user node interface between the source address and the destination address in the virtual private network by means of a user node interface packet Internet groper command.

Optionally, before receiving the ICMP response packet responded by the destination address, the method further includes:

sending the configuration parameter to an access control list and adding a rule used for receiving the ICMP response packet responded by the destination address into the access control list.

Optionally, before the step of sending the configuration parameter to an access control list and adding a rule used for receiving the ICMP response packet responded by the destination address into the access control list, the method further includes:

determining whether the configuration parameter acquired by means of the user node interface packet Internet groper command can be matched to control and information protocol CIP information;

prompting an error of the configuration parameter when the configuration parameter cannot be matched to the CIP information; or entering into the step of sending the configuration parameter to an access control list and adding a rule used for receiving the ICMP response packet responded by the destination address into the access control list when the configuration parameter can be matched to the CIP information.

Optionally, before the step of sending the configuration parameter to an access control list and adding a rule used for receiving the ICMP response packet responded by the destination address into the access control list, the method further includes:

determining whether a port used for sending the configuration parameter is a SmartGroup port;

acquiring a member port bound with SmartGroup when the port is a SmartGroup port, then entering into the step of sending the configuration parameter to an access control list and adding a rule used for receiving the ICMP response packet responded by the destination address into the access control list; and entering into the step of sending the configuration parameter to an access control list and adding a rule used for receiving the ICMP response packet responded by the destination address into the access control list when the port is not a SmartGroup port.

Optionally, before the step of sending the configuration parameter to an access control list and adding a rule used for receiving the ICMP response packet responded by the destination address into the access control list, the method further includes:

determining whether a device positioned at the source address is a distributed device or a centralized device;

entering into the step of sending the configuration parameter to an access control list and adding a rule used for receiving the ICMP response packet responded by the destination address into the access control list when the device positioned at the source address is a centralized device; and transmitting a message delivered to a card provided with an outgoing port when the device positioned at the source address is a distributed device, and then entering into the step of sending the configuration parameter to an access control list and adding a rule used for receiving the ICMP response packet responded by the destination address into the access control list.

Optionally, before the step of transmitting an ICMP request packet from the source address to the destination address through the configuration parameter and receiving an ICMP response packet responded by the destination address, the method further includes:

encapsulating a load part of the ICMP request packet, and calculating a checksum of the ICMP packet;

encapsulating a load part of an IP request packet, and calculating a checksum of the IP packet;

matching a corresponding Address Resolution Protocol ARP entry in an ARP table according to the destination address;

entering into the step of transmitting an ICMP request packet from the source address to the destination address through the configuration parameter and receiving an ICMP response packet responded by the destination address when a corresponding ARP entry is searched out; or caching the ICMP request packet when no corresponding ARP entry is searched out, starting up a cache packet timer, transmitting an ARP broadcast packet request to learn an ARP entry at an opposite end, adding the learned ARP entry into the ARP table, and then entering into the step of transmitting the ICMP request packet from the source address to the destination address through the configuration parameter and receiving an ICMP response packet responded by the destination address.

Optionally, after termination of a user node interface packet Internet groper command, the method further includes:

deleting the created timer and/or emptying ARP entries in the ARP table.

Optionally, the method further includes:

calculating out maximum jitter time and/or minimum jitter time for continuously transmitting ICMP request packets according to a preset calculation strategy, where the preset calculation strategy further includes:

subtracting a round-trip time value calculated out last time from a round-trip time value calculated out this time to obtain a time difference of this jitter when a quantity of received ICMP response packets is greater than 1, maximum jitter time and minimum jitter time being current jitter time when the quantity of received ICMP response packets is 2; recalculating out current jitter time and comparing the current jitter time with previous maximum jitter time and minimum jitter time when the quantity of received ICMP response packets is greater than 2, and taking the current jitter time as present maximum jitter time when the current jitter time is greater than the previous maximum jitter time; or taking the current jitter time as present minimum jitter time when the current jitter time is smaller than the previous minimum jitter time.

According to another aspect of the embodiments of the present disclosure, there is further provided an apparatus for detecting connectivity of user node interface in a virtual private network, including:

an acquiring module, configured to acquire a configuration parameter used for detecting connectivity of a user node interface between a source address and a destination address in the virtual private network;

a transceiving module, configured to transmit an Internet Control Message Protocol ICMP request packet from the source address to the destination address through the configuration parameter and receive an ICMP response packet responded by the destination address; and a statistics module, configured to calculate out a round-trip time value of a link between the source address and the destination address after receiving the ICMP response packet responded by the destination address, and then collect statistics on the connectivity of the user node interface between the source address and the destination address according to the round-trip time value obtained by calculation.

Optionally, the acquiring module is further configured to acquire the configuration parameter used for detecting the connectivity of the user node interface between the source address and the destination address in the virtual private network by means of a user node interface packet Internet groper command.

Optionally, the apparatus further includes:

a configuration parameter sending module, configured to send the configuration parameter to an access control list and add a rule used for receiving the ICMP response packet responded by the destination address into the access control list.

Optionally, the apparatus further includes:

a first determining module, configured to determine whether the configuration parameter acquired by means of the user node interface packet Internet groper command can be matched to control and information protocol CIP information, prompt an error of the configuration parameter when the configuration parameter cannot be matched to the CIP information, or trigger the transceiving module when the configuration parameter can be matched to the CIP information.

Optionally, the apparatus further includes:

a second determining module, configured to determine whether a port used for sending the configuration parameters is a SmartGroup port, acquire a member port bound with SmartGroup and then trigger the configuration parameter sending module when the port is a SmartGroup port, and trigger the configuration parameter sending module when the port is not a SmartGroup port.

Optionally, the apparatus further includes:

a third determining module, configured to determine whether a device positioned at the source address is a distributed device or a centralized device, trigger the transceiving module when the device positioned at the source address is a centralized device, and send a message delivered to a card provided with an outgoing port and then trigger the transceiving module when the device positioned at the source address is a distributed device.

Optionally, the apparatus further includes:

a first encapsulating module, configured to encapsulate a load part of the ICMP request packet, and calculate a checksum of the ICMP packet;

a second encapsulating module, configured to encapsulate a load part of an IP request packet, and calculate a checksum of the IP packet; and a matching module, configured to match a corresponding Address Resolution Protocol ARP entry in an ARP table according to the destination address, and trigger the transceiving module when a corresponding ARP entry is searched out, and cache the ICMP request packet when no corresponding ARP entry is searched out, start up a cache packet timer, transmit an ARP broadcast packet request to learn an ARP entry at an opposite end, add the learned ARP entry into the ARP table, and then trigger the transceiving module.

Optionally, the apparatus further includes:

a deleting module, configured to delete the created timer and/or empty ARP entries in the ARP table.

Optionally, the apparatus further includes:

a jitter time calculating module, configured to: calculate out maximum jitter time and/or minimum jitter time for continuously transmitting ICMP request packets according to a preset calculation strategy, where the preset calculation strategy includes: subtracting a round-trip time value calculated out last time from a round-trip time value calculated out this time to obtain a time difference of this jitter when a quantity of received ICMP response packets is greater than 1; take maximum jitter time and minimum jitter time as current jitter time when the quantity of received ICMP response packets is 2; recalculate out current jitter time and compare the current jitter time with previous maximum jitter time and minimum jitter time when the quantity of received ICMP response packets is greater than 2, and take the current jitter time as present maximum jitter time when the current jitter time is greater than the previous maximum jitter time; or take the current jitter time as present minimum jitter time when the current jitter time is smaller than the previous minimum jitter time.

The embodiments of the present disclosure further provide an apparatus for detecting connectivity of user node interface in a virtual private network, including: a processor; and a memory configured to store instructions executable by the processor; wherein the processor is configured to perform: acquiring a configuration parameter used for detecting connectivity of a user node interface between a source address and a destination address in the virtual private network; transmitting an Internet Control Message Protocol ICMP request packet from the source address to the destination address through the configuration parameter and receiving an ICMP response packet responded by the destination address; and calculating out a round-trip time value of a link between the source address and the destination address after receiving the ICMP response packet responded by the destination address, and then collecting statistics on the connectivity of the user node interface between the source address and the destination address according to the round-trip time value obtained by calculation.

The embodiments of the present disclosure further provide a non-transitory computer-readable storage medium having stored therein instructions that, when executed by a processor of a network device, causes the network device to perform a method for detecting connectivity of user node interface in a virtual private network, the method including: acquiring a configuration parameter used for detecting connectivity of a user node interface between a source address and a destination address in the virtual private network; transmitting an Internet Control Message Protocol ICMP request packet from the source address to the destination address through the configuration parameter and receiving an ICMP response packet responded by the destination address; and calculating out a round-trip time value of a link between the source address and the destination address after receiving the ICMP response packet responded by the destination address, and then collecting statistics on the connectivity of the user node interface between the source address and the destination address according to the round-trip time value obtained by calculation.

Beneficial effects of the present disclosure are as below. According to the embodiments of the present disclosure, connectivity between a source address and a destination address UNI port is detected by way of PING of an ICMP. For example, all base stations positioned at the destination address generally support a PING function of an IP. Therefore, the method and apparatus for detecting connectivity of a user node interface of a virtual private network provided by the embodiments of the present disclosure have advantages of wider applicable scenarios, simple and flexible operations, good portability and scalability, greatly improved detection efficiency and reduced detection cost, etc.

This section provides a summary of various implementations or examples of the technology described in the disclosure, and is not a comprehensive disclosure of the full scope or all features of the disclosed technology.

DETAILED DESCRIPTION

One aspect of embodiments of the present disclosure provides a method for detecting a connectivity of a user node interface of a virtual private network. First of all, a configuration parameter used for detecting a connectivity of a user node interface between a source address and a destination address in the virtual private network is acquired; then an ICMP request packet is transmitted from the source address to the destination address through the configuration parameter, and an ICMP response packet responded by the destination address is received; finally after receiving the ICMP response packet responded by the destination address, a round-trip time value of a link between the source address and the destination address is calculated, and statistics on the connectivity of the user node interface between the source address and the destination address is collected.

The following will describe in more detail the exemplary embodiments of the present disclosure with reference to the accompanying drawings. Although the accompanying drawings display the exemplary embodiments of the present disclosure, it should be understood that the present disclosure may be implemented in various forms but not limited by the embodiments set forth herein. Instead, these embodiments are provided to more thoroughly understand the present disclosure, and completely convey the scope of the present disclosure to those skilled in the art.

Figure 1:
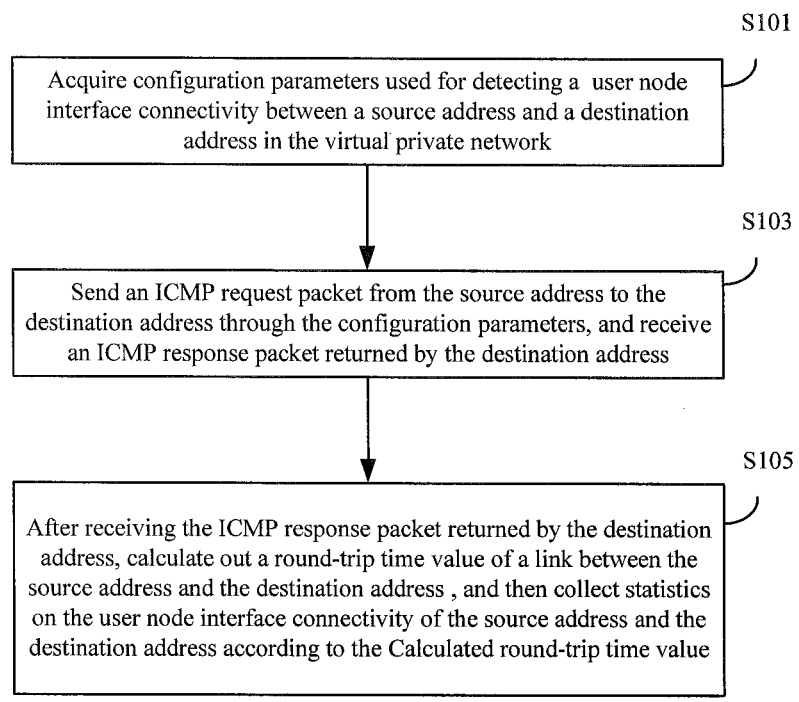
FIG. 1 is a flowchart illustrating a method for detecting connectivity of user node interface in a virtual private network according to embodiments of the present disclosure.

As shown in FIG. 1, it is a flowchart of a method for detecting a connectivity of a user node interface of a virtual private network according to embodiments of the present disclosure, where the method includes following steps.

In Step S101, a configuration parameter used for detecting a connectivity of a user node interface between a source address and a destination address in the virtual private network is acquired.

Optionally, the virtual private network in the embodiments of the present disclosure may be a Layer 2 Virtual Private Network, and of course it is to be understood that the virtual private network in the embodiments of the present disclosure is not limited to this. To those skilled in the art, technical solutions for detecting connectivity in other virtual private networks are similar to the embodiments of the present disclosure, and thus are not repeated any more herein.

Optionally, the device positioned at a source address in the embodiments of the present disclosure may be a packet transport network (PTN), for example, a switch, and a device positioned at the destination address may be a base station. Of course it is to be understood that the device in the embodiments of the present disclosure is not limited to this.

Specifically, in Step S101, a configuration parameter used for detecting a connectivity of a user node interface between a source address and a destination address in the virtual private network may be acquired by means of a user node interface packet Internet groper (UNI-PING) command, where the configuration parameter may be a control and information protocol (CIP) parameter, which includes: a source IP address, a destination IP address, an outgoing port and virtual local area network (VLAN) information, etc.

In Step S103, an Internet Control Message Protocol (ICMP) request packet is transmitted from the source address to the destination address through the configuration parameter, and an ICMP response packet responded by the destination address is received.

Optionally, executed synchronously with Step S103 or executed before Step S103, the configuration parameter is sent to an access control list, and a rule used for receiving the ICMP response packet responded by the destination address is added into the access control list (ACL) so that the received ICMP response packet may be sent to a central processing unit (CPU) through a special access control list rule.

In Step S105, a round-trip time value of a link between the source address and the destination address is calculated out after receiving the ICMP response packet responded by the destination address, and then statistics on the connectivity of the user node interface between the source address and the destination address is collected according to the round-trip time value obtained by calculation.

Detecting connectivity between a base station and a user node interface of a PTN device is taken as an example, in Step S103~Step S105, a unicast ICMP request packet may be transmitted to the base station (positioned at the destination address) and it is waited the base station to respond to the ICMP response packet. After termination of a command, a receiver's address information is displayed, and a round-trip time (RTT) value of a link is calculated. The RTT value is an important performance index in a computer network, which may represent a total time delay starting from transmitting data by a transmitting end to receiving by the transmitting end a confirmation from a receiving end (the receiving end immediately transmits the confirmation after receiving data). A distance between two points may be reflected to a certain extent through the parameter.

In the embodiments of the present disclosure, connectivity between the base station and a UNI port of the PTN device is detected by using PING of ICMP, this is because the base station generally supports a PING function of an IP. Therefore, the embodiments of the present disclosure have wider applicable scenarios, simple and flexible operations, good portability and scalability, greatly improved detection efficiency and reduced detection cost, etc.

Figure 2:
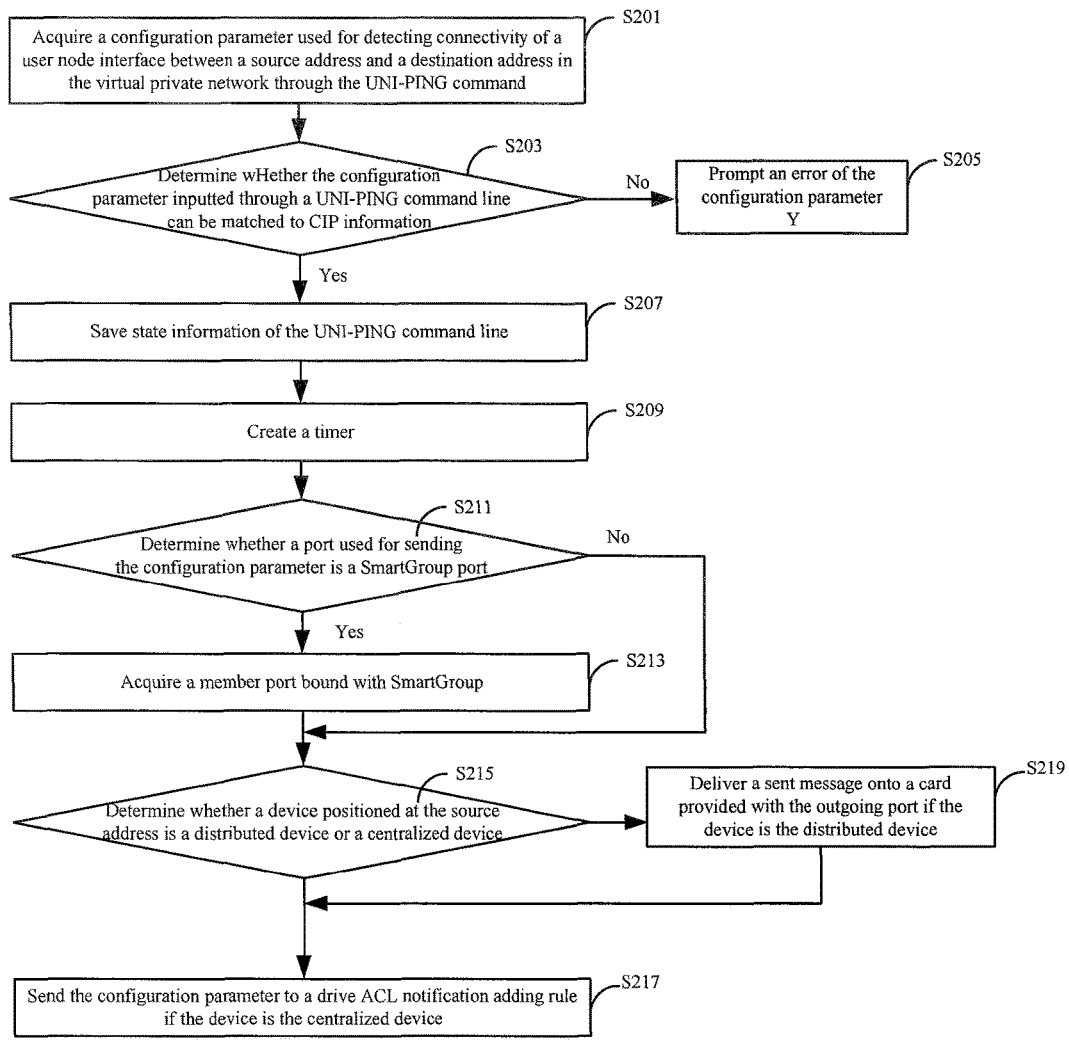
FIG. 2 is a flowchart illustrating processing initiated by a UNI-PING command according to embodiments of the present disclosure.

As shown in FIG. 2, it is a flowchart of processing initiated by a UNI-PING command according to embodiments of the present disclosure, where specific steps are as below.

In Step S201, a configuration parameter used for detecting a connectivity of a user node interface between a source address and a destination address in the virtual private network is acquired through the UNI-PING command.

Optionally, the configuration parameter may be a CIP parameter, which includes: a source IP address, a destination IP address, an outgoing port and VLAN information, etc. Of course it is to be understood that specific contents of the configuration parameter are not limited in the embodiments of the present disclosure, and a user may correspondingly specify other configuration parameters according to different access modes.

To avoid the user's abnormal operation, after Step S201, it is entered into Step S203, in which it is determined whether the configuration parameter inputted through a UNI-PING command line can be matched to CIP information, and it is entered into Step S205 if the configuration parameter cannot be matched to the CIP information, otherwise it is entered into Step S207.

In Step S205, an error of the configuration parameter is prompted.

In Step S207, state information of the UNI-PING command line is saved.

In Step S209, a timer is created.

For example, a related timer (such as a timeout timer, a speed-limiting timer, an OAM echo scanning timer and so on). Specifically, in this process, the speed-limiting timer and the timeout timer may be created, where the speed-limiting timer is used for controlling the number of transmitted packets within a certain period. When transmitting packets, the speed-limiting timer calculates the number of transmitted packets within a speed-limiting period, and continue transmitting packets if a speed-limiting number is not reached, otherwise it is immediately returned. After timeout, the speed-limiting timer may reset the number of transmitted packets within the speed-limiting period, and start to transmit packets in a new speed-limiting period. Since if the speed is not limited, a CPU may receive a lot of returned packets within a short time, and packet loss may be caused if it is too busy to process the packets. The timeout timer is used for indicating timeout if no returned packet is received within a period of time after the packet is sent out when the UNI-PING command is executed. After timeout, the timeout timer may print timeout information to a terminal and start a timeout detection of a new period. In a process of transmitting packets, the timeout timer may be reset after transmitting packets so as to start to recalculate timeout time.

In Step S211, it is determined whether a port used for sending the configuration parameter is a SmartGroup port; it is entered into Step S213 if the port is the SmartGroup port; otherwise it is entered into Step S215.

In Step S213, a member port bound by SmartGroup is acquired, and then it is entered into Step S215.

In Step S215, it is determined whether a device positioned at the source address is a distributed device or a centralized device; it is entered into Step S217 if the device is the centralized device; or it is entered into Step S219 if the device is the distributed device.

To the distributed device, following points are mainly taken into account: (1) To a PING request packet and an ARP request packet of the UNI-PING, when transmitting packets, it is required to consider delivering the packets from a master control station to a line card. (2) Information on the line card needs to be saved when information sent to the drive ACL is delivered by the master control station to the line card so that after receiving a returned packet, it is determined whether the packet is an ARP response packet or a PING response packet of the UNI-PING according to the information. (3) When the ARP packet and the ICMP response packet responded by the base station are received, they need to be delivered from the line card to a PING process of the master control station for processing.

In Step S217, the configuration parameter is sent to a drive ACL notification adding rule, specifically, the state information of the UNI-PING and the configuration parameter are integrated into the drive ACL notification adding rule.

In Step S219, a sent message is delivered onto a card where the outgoing port is for processing, and then it is entered into Step S217.

Figure 3:
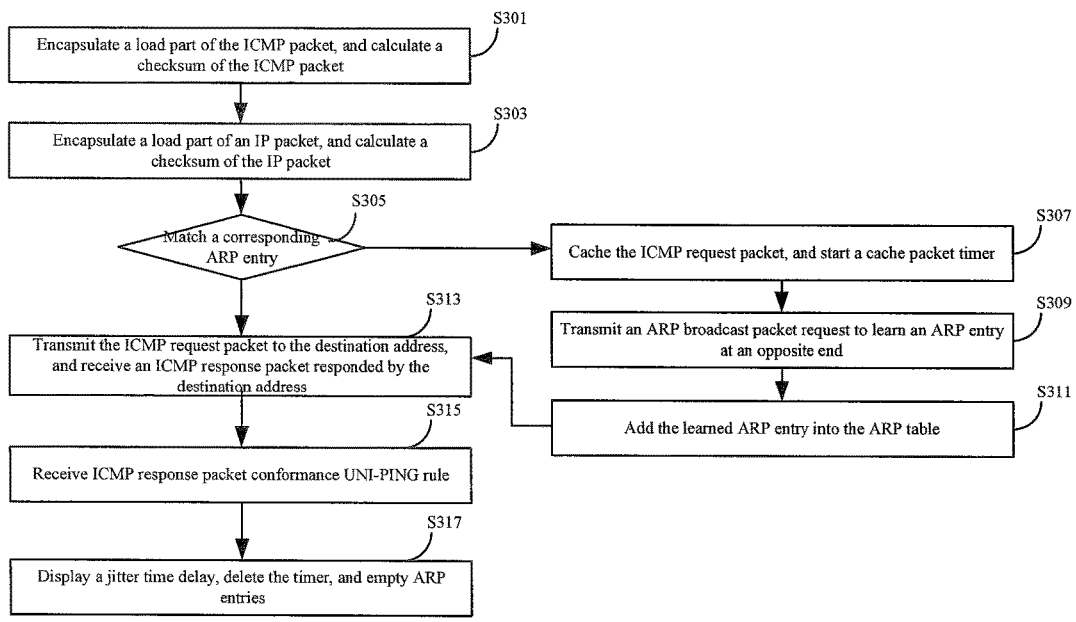
FIG. 3 is a processing flowchart of transmitting an ICMP request packet and receiving an ICMP response packet according to embodiments of the present disclosure.

As shown in FIG. 3, it is a processing flowchart of transmitting an ICMP request packet and receiving an ICMP response packet according to embodiments of the present disclosure, where specific steps are as below.

In Step S301, a load part of the ICMP packet is encapsulated, and a checksum of the ICMP packet is calculated.

In Step S303, a load part of an IP packet is encapsulated, and a checksum of the IP packet is calculated.

In Step S305, a corresponding Address Resolution Protocol (ARP) entry is matched in an ARP table according to the destination address, it is entered into Step S307 if no corresponding ARP entry is searched out; or it is entered into Step S313 if a corresponding ARP entry is searched out.

In Step S307, the ICMP request packet is cached, a cache packet timer is started, and then it is entered into Step S309.

In Step S309, an ARP broadcast packet request is transmitted to learn an ARP entry at an opposite end, and then it is entered into Step S311.

In Step S311, the learned ARP entry is added into the ARP table, and then it is entered into Step S313.

In Step S313, the ICMP request packet is transmitted to the destination address, an ICMP response packet responded by the destination address is received, and then it is entered into Step S315.

In Step S315, an ICMP response packet conformance UNI-PING rule is received.

When the ICMP response packet and the ARP response packet responded by the base station are received, they need to be matched with the state information saved in UNI-PING. In this case, the route-based ARP response packet and the ICMP response packet frequently used may also be detected herein, which may have a negative effect on an efficiency in software execution. It is considered that a special mark is specified in a process of initiating the UNI-PING, upon completion, the mark is emptied for processing. It is avoided that the efficiency may be affected by UNI-PING detection of other packets.

In Step S317, a jitter time delay is displayed, the timer is deleted, and ARP entries are emptied.

Herein it is needed to calculate a period of time (namely RTT) from transmitting the ICMP request packet to receiving a unicast ICMP response packet. When transmitting the ICMP request packet, the ICMP request packet may be marked with a timestamp and saved, the current timestamp may be acquired when the terminal echoes information, and a difference value between both is the RTT value (ms). Maximum jitter time and/or minimum jitter time for continuously transmitting ICMP request packets may also be calculated out according to a preset calculation strategy. The preset calculation strategy is as below: an RTT value calculated out last time is subtracted from an RTT value calculated out this time to obtain a time difference of this jitter when a quantity of received ICMP response packets is greater than 1. Both maximum jitter time and minimum jitter time are current jitter time when the quantity of received ICMP response packets is exactly 2. The current jitter time is recalculated out and compared with previous maximum jitter time and minimum jitter time when the quantity of received ICMP response packets is greater than 2. The current jitter time is taken as present maximum jitter time if the current jitter time is greater than the previous maximum jitter time. The current jitter time is taken as present minimum jitter time if the current jitter time is smaller than the previous minimum jitter time.

In the embodiments of the present disclosure, there are two conditions on termination of the UNIP-PING command.

Condition I: timeout time is reached. In a process of triggering the UNIP-PING by using a command, prompt information is displayed in a user interface if no response packet is received within the specified time.

Condition II: in response to a preset operation such as an operation of pressing Ctrl+C, the UNIP-PING is terminated.

One point needing special attention is recovery of an abnormal operation in a UNIP-PING process.

In the embodiments of the present disclosure, special considerations of automatic recovery need to be given in following abnormal circumstances.

Circumstance I: a line card is restarted.

In a process of the UNIP-PING, if the line card is restarted, the drive ACL rule may not take effect, and it is required to delete the rule and then resend a rule to avoid residue of the original ACL rule.

Circumstance II: a CIP operation is deleted.

When UNIP-PING transmits packets, it is required to determine whether configuration information can be matched to a corresponding CIP, it belongs to an error specified by a user and prompt information is given if the configuration information cannot be matched to the CIP. Every time when packets are transmitted, it is necessary to make a CIP matching check to prevent the CIP from being abnormally deleted or a result of a detection error may still occur when an L2VPN example is unbound.

Creation of a public network ARP table in the embodiments of the present disclosure: the public network ARP table is created, added, deleted and accessed in a PROTOCOL process. To a UNI-PING function, since the UNI-PING command is initiated in a PING process, creation and query of an ARP table of UNI-PING are processed in the PING process. Herein, when packets are received, a PING response packet and an ARP packet responded at a base station side need to be uniformly delivered from the PROTOCOL process to the PING process to complete operations such as echoing and management of the ARP table. The ARP table is a global table, which is mainly used to prevent multiprocess access conflict caused by multiprocess operation on one table.

Figure 4:
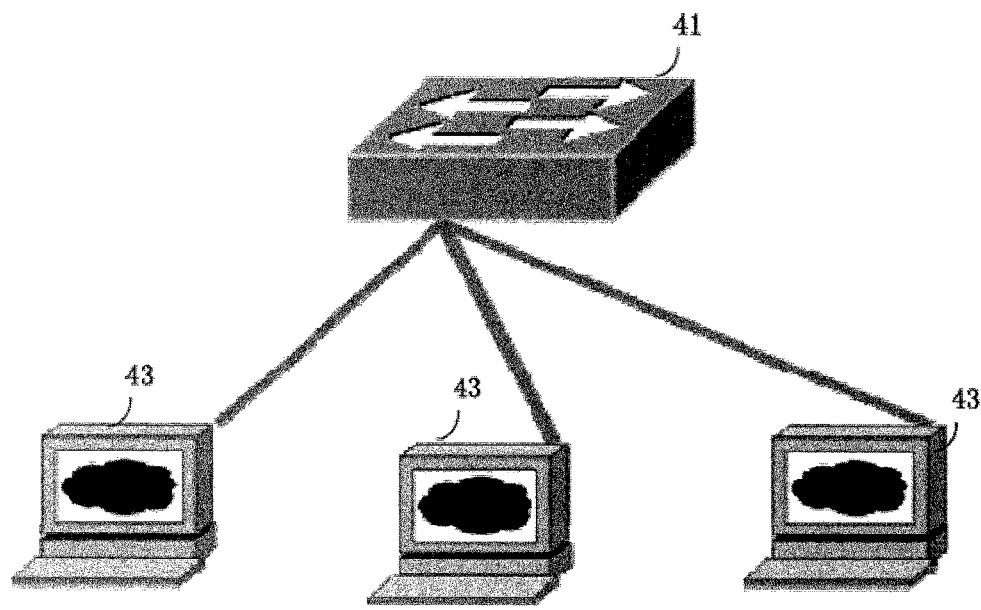
FIG. 4 is a schematic diagram illustrating an example of a topological environment for detecting connectivity of user node interface in a virtual private network according to embodiments of the present disclosure.

An implementation process of a UNI-PING is described in the following with reference to a specific example. As shown in FIG. 4, a switch (PE) 41 and a base station (or PC) 43 in FIG. 4 use AC access modes (Port, Port+vlan, port+vlan+pri, port+qinq, and so on) of L2VPN. The switch 41 initiates the UNI-PING command, and specifies a physical port, a source IP address (which may be arbitrarily specified as long as the source IP address and a destination IP address are in the same network segment) and the destination IP address according to a command line, whereas other parameters may be optional. First of all, at the same time when an ICMP Ping request packet is generated, it is required to send information specified by the UNI-PING command to a drive ACL. To acquire an MAC address of the base station 43, the module also needs to support to transmit an ARP packet and respond an ARP packet (which may be a request packet or a response packet) sent from a customer edge router device. Since the switch 41 and the customer edge router are different in ARP aging rate, the ARP at the base station 43 may age first, in this case an ARP request packet may be triggered to the switch 41, and thus it is needed to consider processing the request packet. Upon completion of the UNI-PING command, information such as the timer created by the UNI-PING is deleted, furthermore, it is required to notify, drive and delete ACL information corresponding to the UNI-PING, thereby saving drive ACL table entry space.

Figure 5:
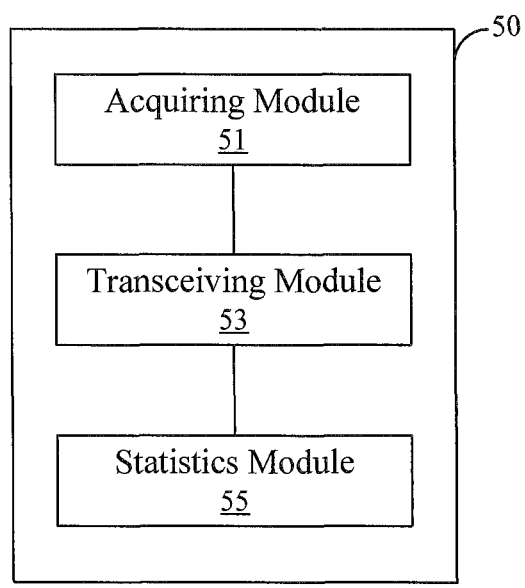
FIG. 5 is a block diagram illustrating an apparatus for detecting connectivity of user node interface in a virtual private network according to embodiments of the present disclosure.

According to another aspect of the present disclosure, there is provided an apparatus for detecting a connectivity of a user node interface of a virtual private network, as shown in FIG. 5, the apparatus 50 includes:

an acquiring module 51, configured to acquire a configuration parameter used for detecting a connectivity of a user node interface between a source address and a destination address in the virtual private network;

a transceiving module 53, configured to transmit an Internet Control Message Protocol (ICMP) request packet from the source address to the destination address through the configuration parameter and receive an ICMP response packet responded by the destination address; and a statistics module 55, configured to calculate out a round-trip time value of a link between the source address and the destination address after receiving the ICMP response packet responded by the destination address, and collect statistics on the connectivity of the user node interface between the source address and the destination address.

Optionally, the acquiring module is further configured to acquire the configuration parameter used for detecting the connectivity of the user node interface between the source address and the destination address in the virtual private network by means of a user node interface packet Internet groper command.

Optionally, the apparatus 50 further includes:

a configuration parameter sending module, configured to send the configuration parameter to an access control list and add a rule used for receiving the ICMP response packet responded by the destination address into the access control list.

Optionally, the apparatus 50 further includes:

a first determining module, configured to determine whether the configuration parameter acquired by means of the user node interface packet Internet groper command can be matched to control and information protocol CIP information, and prompt an error of the configuration parameter if the configuration parameter cannot be matched to the CIP information, or trigger the transceiving module if the configuration parameter can be matched to the CIP information.

Optionally, the apparatus 50 further includes:

a second determining module, configured to determine whether a port used for sending the configuration parameters is a SmartGroup port, acquire a member port bound by SmartGroup and then trigger the configuration parameter sending module if the port is the SmartGroup port, or trigger the configuration parameter sending module if the port is not the SmartGroup port.

Optionally, the apparatus 50 further includes:

a third determining module, configured to determine whether a device positioned at the source address is a distributed device or a centralized device, trigger the transceiving module if the device positioned at the source address is a centralized device, or send a message delivered to a card where an outgoing port is for processing and then trigger the transceiving module if the device positioned at the source address is a distributed device.

Optionally, the apparatus 50 further includes:

a first encapsulating module, configured to encapsulate a load part of the ICMP request packet, and calculate a checksum of the ICMP packet;

a second encapsulating module, configured to encapsulate a load part of an IP request packet, and calculate a checksum of the IP packet; and a matching module, configured to match a corresponding Address Resolution Protocol ARP entry in an ARP table according to the destination address, and trigger the transceiving module if a corresponding ARP entry is searched out, or cache the ICMP request packet if no corresponding ARP entry is searched out, start up a cache packet timer, transmit an ARP broadcast packet request to learn an ARP entry at an opposite end, add the learned ARP entry into the ARP table, and then trigger the transceiving module.

Optionally, the apparatus 50 further includes:

a deleting module, configured to delete the created timer and/or empty ARP entries in the ARP table.

Optionally, the apparatus 50 further includes:

a jitter time calculating module, configured to: calculate out maximum jitter time and/or minimum jitter time for continuously transmitting ICMPrequest packets according to a preset calculation strategy, where the preset calculation strategy includes: subtracting a round-trip time value calculated out last time from a round-trip time value calculated out this time to obtain a time difference of this jitter when a quantity of received ICMP response packets is greater than 1; take maximum jitter time and minimum jitter time as current jitter time when the quantity of received response packets is 2; recalculate out current jitter time and compare the current jitter time with previous maximum jitter time and minimum jitter time when the quantity of received response packets is greater than 2, and take the current jitter time as present maximum jitter time if the current jitter time is greater than the previous maximum jitter time; or take the current jitter time as present minimum jitter time if the current jitter time is smaller than the previous minimum jitter time.

The abovementioned embodiments are merely preferred embodiments of the present disclosure. It shall be pointed out that to those of ordinary skill in the art, various improvements and embellishments may be made without departing from the principle of the present disclosure, and these improvements and embellishments are also deemed to be within the scope of protection of the present disclosure.

What is claimed is:

1. A method for detecting connectivity of user node interface in a virtual private network, comprising:
    acquiring a configuration parameter used for detecting connectivity of a user node interface between a source address and a destination address in the virtual private network;
    transmitting an Internet Control Message Protocol ICMP request packet from the source address to the destination address through the configuration parameter and receiving an ICMP response packet responded by the destination address; and
    calculating out a round-trip time value of a link between the source address and the destination address after receiving the ICMP response packet responded by the destination address, and then collecting statistics on the connectivity of the user node interface between the source address and the destination address according to the round-trip time value obtained by calculation,
    wherein before receiving the ICMP response packet responded by the destination address, the method further comprises:
    sending the configuration parameter to an access control list and adding a rule used for receiving the ICMP response packet responded by the destination address into the access control list, and
    before sending the configuration parameter to an access control list and adding a rule used for receiving the ICMP response packet responded by the destination address into the access control list, the method further comprises:
    determining whether the configuration parameter acquired by means of the user node interface packet Internet groper command can be matched to control and information protocol CIP information;
    prompting an error of the configuration parameter when the configuration parameter cannot be matched to the CIP information; or
    performing the sending the configuration parameter to an access control list and adding a rule used for receiving the ICMP response packet responded by the destination address into the access control list when the configuration parameter can be matched to the CIP information.

2. The method according to claim 1, wherein the acquiring a configuration parameter used for detecting connectivity of a user node interface between a source address and a destination address in the virtual private network comprises:
    acquiring the configuration parameter used for detecting the connectivity of the user node interface between the source address and the destination address in the virtual private network by means of a user node interface packet Internet groper command.

3. The method according to claim 1, wherein before sending the configuration parameter to an access control list and adding a rule used for receiving the ICMP response packet responded by the destination address into the access control list, the method further comprises:
    determining whether a port used for sending the configuration parameter is a SmartGroup port;
    acquiring, when the port is a SmartGroup port, a member port bound with SmartGroup, and then performing the sending the configuration parameter to an access control list and adding a rule used for receiving the ICMP response packet responded by the destination address into the access control list; and
    performing the sending the configuration parameter to an access control list and adding a rule used for receiving the ICMP response packet responded by the destination address into the access control list when the port is not a SmartGroup port.

4. The method according to claim 3, wherein before sending the configuration parameter to an access control list and adding a rule used for receiving the ICMP response packet responded by the destination address into the access control list, the method further comprises:
    determining whether a device positioned at the source address is a distributed device or a centralized device;
    performing the sending the configuration parameter to an access control list and adding a rule used for receiving the ICMP response packet responded by the destination address into the access control list when the device positioned at the source address is a centralized device; and
    transmitting a message delivered to a card provided with an outgoing port when the device positioned at the source address is a distributed device, and then performing the sending the configuration parameter to an access control list and adding a rule used for receiving the ICMP response packet responded by the destination address into the access control list.

5. The method according to claim 1, wherein before transmitting an ICMP request packet from the source address to the destination address through the configuration parameter and receiving an ICMP response packet responded by the destination address, the method further comprises:
    encapsulating a load part of the ICMP request packet, and calculating a checksum of the ICMP packet;
    encapsulating a load part of an IP request packet, and calculating a checksum of the IP packet;
    matching a corresponding Address Resolution Protocol ARP entry in an ARP table according to the destination address;
    performing the transmitting an ICMP request packet from the source address to the destination address through the configuration parameter and receiving an ICMP response packet responded by the destination address when a corresponding ARP entry is searched out; and
    caching the ICMP request packet when no corresponding ARP entry is searched out, starting up a cache packet timer, transmitting an ARP broadcast packet request to learn an ARP entry at an opposite end, adding the learned ARP entry into the ARP table, and then performing the transmitting the ICMP request packet from the source address to the destination address through the configuration parameter and receiving an ICMP response packet responded by the destination address.

6. The method according to claim 5, wherein after termination of a user node interface packet Internet groper command, the method further comprises:
    deleting the created timer and/or emptying ARP entries in the ARP table.

7. The method according to claim 1, further comprising:
calculating out maximum jitter time and/or minimum jitter time for continuously transmitting ICMP request packets according to a preset calculation strategy, wherein the preset calculation strategy comprises:
subtracting a round-trip time value calculated out last time from a round-trip time value calculated out this time to obtain a time difference of this jitter when a quantity of received ICMP response packets is greater than 1; maximum jitter time and minimum jitter time being current jitter time when the quantity of received ICMP response packets is 2; recalculating out current jitter time and comparing the current jitter time with previous maximum jitter time and minimum jitter time when the quantity of received ICMP response packets is greater than 2, and taking the current jitter time as present maximum jitter time when the current jitter time is greater than the previous maximum jitter time; or taking the current jitter time as present minimum jitter time when the current jitter time is smaller than the previous minimum jitter time.

8. An apparatus for detecting connectivity of user node interface in a virtual private network, comprising:
a processor; and
a memory configured to store instructions executable by the processor;
wherein the processor is configured to perform:
acquiring a configuration parameter used for detecting connectivity of a user node interface between a source address and a destination address in the virtual private network;
transmitting an Internet Control Message Protocol ICMP request packet from the source address to the destination address through the configuration parameter and receiving an ICMP response packet responded by the destination address; and
calculating out a round-trip time value of a link between the source address and the destination address after receiving the ICMP response packet responded by the destination address, and then collecting statistics on the connectivity of the user node interface between the source address and the destination address according to the round-trip time value obtained by calculation,
wherein before receiving the ICMP response packet responded by the destination address, the processor is further configured to perform:
sending the configuration parameter to an access control list and adding a rule used for receiving the ICMP response packet responded by the destination address into the access control list, and
before sending the configuration parameter to an access control list and adding a rule used for receiving the ICMP response packet responded by the destination address into the access control list, the processor is further configured to perform:
determining whether the configuration parameter acquired by means of the user node interface packet Internet groper command can be matched to control and information protocol CIP information;
prompting an error of the configuration parameter when the configuration parameter cannot be matched to the CIP information; or
performing the sending the configuration parameter to an access control list and adding a rule used for receiving the ICMP response packet responded by the destination address into the access control list when the configuration parameter can be matched to the CIP information.

9. The apparatus according to claim 8, wherein the processor is configured to perform:
acquiring the configuration parameter used for detecting the connectivity of the user node interface between the source address and the destination address in the virtual private network by means of a user node interface packet Internet groper command.

10. The apparatus according to claim 8, wherein before sending the configuration parameter to an access control list and adding a rule used for receiving the ICMP response packet responded by the destination address into the access control list, the processor is further configured to perform:
determining whether a port used for sending the configuration parameter is a SmartGroup port;
acquiring, when the port is a SmartGroup port, a member port bound with SmartGroup, and then performing the sending the configuration parameter to an access control list and adding a rule used for receiving the ICMP response packet responded by the destination address into the access control list; and
performing the sending the configuration parameter to an access control list and adding a rule used for receiving the ICMP response packet responded by the destination address into the access control list when the port is not a SmartGroup port.

11. The apparatus according to claim 10, wherein before sending the configuration parameter to an access control list and adding a rule used for receiving the ICMP response packet responded by the destination address into the access control list, the processor is further configured to perform:
determining whether a device positioned at the source address is a distributed device or a centralized device;
performing the sending the configuration parameter to an access control list and adding a rule used for receiving the ICMP response packet responded by the destination address into the access control list when the device positioned at the source address is a centralized device; and
transmitting a message delivered to a card provided with an outgoing port when the device positioned at the source address is a distributed device, and then performing the sending the configuration parameter to an access control list and adding a rule used for receiving the ICMP response packet responded by the destination address into the access control list.

12. The apparatus according to claim 8, wherein before transmitting an ICMP request packet from the source address to the destination address through the configuration parameter and receiving an ICMP response packet responded by the destination address, the processor is further configured to perform:
encapsulating a load part of the ICMP request packet, and calculating a checksum of the ICMP packet;
encapsulating a load part of an IP request packet, and calculating a checksum of the IP packet;
matching a corresponding Address Resolution Protocol ARP entry in an ARP table according to the destination address;
performing the transmitting an ICMP request packet from the source address to the destination address through the configuration parameter and receiving an ICMP response packet responded by the destination address when a corresponding ARP entry is searched out; and caching the ICMP request packet when no corresponding ARP entry is searched out, starting up a cache packet timer, transmitting an ARP broadcast packet request to learn an ARP entry at an opposite end, adding the learned ARP entry into the ARP table, and then performing the transmitting the ICMP request packet from the source address to the destination address through the configuration parameter and receiving an ICMP response packet responded by the destination address.

13. The apparatus according to claim 12, wherein after termination of a user node interface packet Internet groper command, the processor is further configured to perform:
deleting the created timer and/or emptying ARP entries in the ARP table.

14. The apparatus according to claim 8, wherein the processor is further configured to perform:
calculating out maximum jitter time and/or minimum jitter time for continuously transmitting ICMP request packets according to a preset calculation strategy, wherein the preset calculation strategy comprises:
subtracting a round-trip time value calculated out last time from a round-trip time value calculated out this time to obtain a time difference of this jitter when a quantity of received ICMP response packets is greater than 1; maximum jitter time and minimum jitter time being current jitter time when the quantity of received ICMP response packets is 2; recalculating out current jitter time and comparing the current jitter time with previous maximum jitter time and minimum jitter time when the quantity of received ICMP response packets is greater than 2, and taking the current jitter time as present maximum jitter time when the current jitter time is greater than the previous maximum jitter time; or taking the current jitter time as present minimum jitter time when the current jitter time is smaller than the previous minimum jitter time.

15. A non-transitory computer-readable storage medium having stored therein instructions that, when executed by a processor of a network device, causes the network device to perform a method for detecting connectivity of user node interface in a virtual private network, the method comprising:

acquiring a configuration parameter used for detecting connectivity of a user node interface between a source address and a destination address in the virtual private network;

transmitting an Internet Control Message Protocol ICMP request packet from the source address to the destination address through the configuration parameter and receiving an ICMP response packet responded by the destination address; and calculating out a round-trip time value of a link between the source address and the destination address after receiving the ICMP response packet responded by the destination address, and then collecting statistics on the connectivity of the user node interface between the source address and the destination address according to the round-trip time value obtained by calculation, wherein before receiving the ICMP response packet responded by the destination address, the method further comprises:

sending the configuration parameter to an access control list and adding a rule used for receiving the ICMP response packet responded by the destination address into the access control list, and before sending the configuration parameter to an access control list and adding a rule used for receiving the ICMP response packet responded by the destination address into the access control list, the method further comprises:

determining whether the configuration parameter acquired by means of the user node interface packet Internet groper command can be matched to control and information protocol CIP information;

prompting an error of the configuration parameter when the configuration parameter cannot be matched to the CIP information; or performing the sending the configuration parameter to an access control list and adding a rule used for receiving the ICMP response packet responded by the destination address into the access control list when the configuration parameter can be matched to the CIP information.

* * * * *